(12) United States Patent
Hunzinger

(10) Patent No.: US 7,079,946 B2
(45) Date of Patent: Jul. 18, 2006

(54) ITERATIVE LOGICAL RENEWAL OF NAVIGABLE MAP DATABASE

(75) Inventor: Jason F Hunzinger, Escondido, CA (US)

(73) Assignee: DENSO Corporation, Kariya (JP)

( * ) Notice: Subject to any disclaimer, the term of this patent is extended or adjusted under 35 U.S.C. 154(b) by 229 days.

(21) Appl. No.: 10/652,329

(22) Filed: Aug. 29, 2003

(65) Prior Publication Data
US 2005/0049783 A1    Mar. 3, 2005

(51) Int. Cl.
G01C 21/26   (2006.01)
G06F 7/00    (2006.01)

(52) U.S. Cl. .................. 701/208; 701/25; 701/210; 707/102; 707/104.1; 707/200

(58) Field of Classification Search ............ 701/25–26, 701/208–211; 707/1, 3, 5–6, 100, 102, 104.1, 707/200, 203; 340/988, 990, 995.1, 995.12, 340/995.14, 995.2, 995.18, 995.22; 342/357.13
See application file for complete search history.

(56) References Cited

U.S. PATENT DOCUMENTS

| | | | |
|---|---|---|---|
| 5,953,722 A * | 9/1999 | Lampert et al. ............ 707/100 |
| 6,038,559 A * | 3/2000 | Ashby et al. .................. 707/4 |
| 6,487,559 B1 * | 11/2002 | McGrath et al. ............ 707/200 |
| 6,507,850 B1 * | 1/2003 | Livshutz et al. ......... 707/104.1 |
| 6,546,334 B1 * | 4/2003 | Fukuchi et al. ............. 701/208 |
| 6,549,847 B1 * | 4/2003 | Ikeuchi et al. .............. 701/208 |
| 6,636,802 B1 * | 10/2003 | Nakano et al. ............. 701/208 |
| 6,643,584 B1 * | 11/2003 | Ikeuchi et al. .............. 701/209 |
| 6,678,611 B1 * | 1/2004 | Khavakh et al. ............ 701/210 |
| 6,704,649 B1 * | 3/2004 | Miyahara ..................... 701/208 |
| 6,728,633 B1 * | 4/2004 | Mikuriya et al. ........... 701/208 |
| 6,853,913 B1 * | 2/2005 | Cherveny et al. ........... 701/208 |
| 2003/0220735 A1* | 11/2003 | Nimura ....................... 701/208 |
| 2004/0039524 A1* | 2/2004 | Adachi ........................ 701/209 |
| 2004/0205517 A1* | 10/2004 | Lampert et al. ............ 715/502 |

FOREIGN PATENT DOCUMENTS

GB     2237905 A  *  5/1991

* cited by examiner

*Primary Examiner*—Jacques H. Louis-Jacques
(74) *Attorney, Agent, or Firm*—Harness, Dickey & Pierce, PLC

(57) ABSTRACT

An improved method is provided for identifying road sections in a navigation database. The method includes: receiving a database update identifying at least one road intersection; constructing a logical representation of the road topology surrounding the at least one road intersection; and identifying the at least one road intersection in the navigation database by comparing the logical representation to a logical representation of the navigation database.

11 Claims, 12 Drawing Sheets

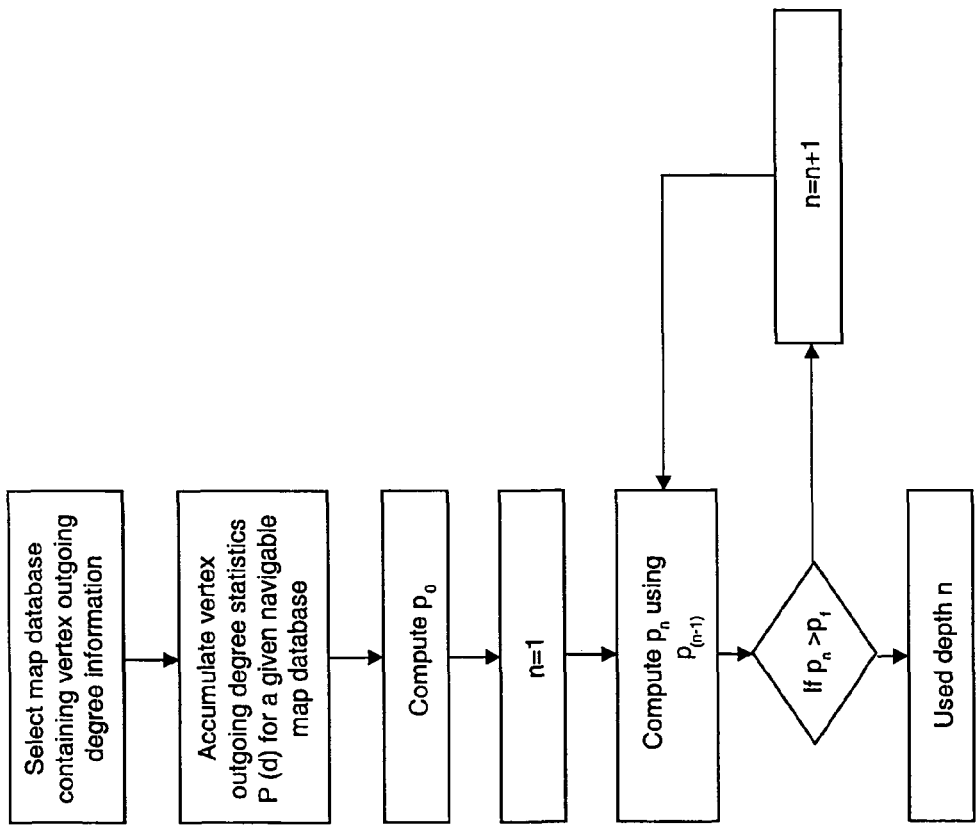

ITERATIVE LOGICAL RENEWAL OF NAVIGABLE MAP DATABASE

FIELD OF THE INVENTION

The present invention relates to navigation systems and, more particularly, to a method of navigation map database renewal using iterative logical graph patching.

BACKGROUND OF THE INVENTION

Navigation systems use navigation map databases to provide users with route calculation, guidance, point-of-interest search and other navigation functions. Navigation map databases typical include data representing road networks and attributes such as in the format described by the KIWI format published by the KIWI-W Consortium, version 1.22, May 2000, incorporated herein by reference. Navigation system performance depends on valid data and, therefore, it is important to update or renew the navigation map database when road networks or their elements change significantly, due to road construction. Renewal of a navigation map database can be accomplished by: (i) replacing the database, (ii) modifying the database or (iii) patching the database. The large size of a wide-area navigation map database renders modifying or patching parts of the database a preferred method for renewal by wireless communications. Some navigation map databases are stored on read-only medium such as CD-ROMs or DVD-ROMs. This adds an additional constraint that the original map database may not be modified and presents unique challenges for patching. While correlating update information with the original database is a common challenge regardless of the type of medium, the build up of patched data after multiple renewals may complicate renewal further. Furthermore, since a patch can be maintained separately from original data, a method of efficient renewal and seamless and stable access by applications is also required.

Different versions of navigation map databases and different sources of navigation map database data contribute to a large variation in detailed data contents among navigation system databases and render identification of the road network parts that have changed problematic due to their version dependence. Additionally, some users may miss or skip updates or partially update their database with regions of interest and therefore further contribute to the number of different database versions in use. For example between databases, the geographic locations and attributes of road structures may be significantly different, the identification assigned to a road structure may be different or even somewhat random, and the road network structures used to represent a road network section may be different. It is not uncommon for roads to have no name, for example. However, keeping track of all versions and sending updates tailored to specific navigation systems lacks robustness and is inflexible and inefficient, both in storage and use of communication bandwidth. Therefore, a method is required to identify a road network element to be updated that is flexible enough to function with multiple database versions and to function on database versions that have previously been modified, in whole or in part.

The present invention focuses on solving the above problems by a renewal operation that identifies modified road network elements independent of database version-specific information and does not necessarily require modification of an original database.

SUMMARY OF THE INVENTION

In accordance with the present invention, an improved method is provided for identifying a road element in a navigation database. The method includes: receiving a database update identifying at least one road intersection; constructing a logical representation of the road topology surrounding the at least one road intersection; and identifying the at least one road intersection in the navigation database by comparing the logical representation to a logical representation of the navigation database.

In another aspect of the present invention, an improved method is provided for updating a navigation database. The method includes: receiving an update instruction specifying two nodes and a link, where the nodes represent road intersections and the link represents a road segment interconnecting the two nodes; identifying an existing node in the navigation database which corresponds to at least one of the specified nodes using a logical pattern matching operation; classifying each of the specified nodes based on its relation to at least one of an existing node or an existing link in the navigation database; and applying the update instruction in accordance with an ordered operations rule set.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 6 depicts a flow chart showing how to determine the tree depth required to achieve a desired matching probability;

DETAILED DESCRIPTION OF THE PREFERRED EMBODIMENTS

A map database may be represented as a directed graph in which one or more directed edges (links) represent each road segment and adjacent edges are connected at vertices (nodes) representing intersections or road segment connections. Typical navigation map database formats, such as KIWI, comprise lists of links with attributes as is well known in the art. A map database update may be comprised of an ordered set of operations on links where links have associated attributes. The importance of ordering will be established below. Each link is represented as a directed edge and two vertices. Vertices are updated as part of an operation on an edge they are connected to. The present invention comprises step-wise renewal by link-based operations that can be applied by identifying a link to update by matching update data to original data and subsequently modifying or patching the original data.

According to the method presented herein, two distinct but interdependent functions are described: (1) the application of a patch or modification to an original or previously augmented database; and (2) providing applications with an integrated abstract interface to the augmented database. From an application perspective, it is desirable to have a single interface for accessing the database as if it were one integrated database incorporating all prior patches or modifications. Renewal can be applied as a modification to the database or as a patch. The patch maintenance operation applies all received patches to a patch database without modifying the original database. However, applications need not know this or act differently.

The problem of patch application may be approached iteratively, i.e. by adding one link at a time or in sections. In a preferred embodiment, a complete update is applied link-by-link. In this context, a link inherently includes two vertices (i.e., a start and an end relative to the directed edge). A graph may be patched independently of applications to incorporate a single link update by detecting a query that relates to that link by location, identification or otherwise and providing modified feedback based on the patch. In another embodiment, a complete update is applied in a sequence of identifications and changes to sub-networks (i.e. sets of related links and nodes).

Figure 1:
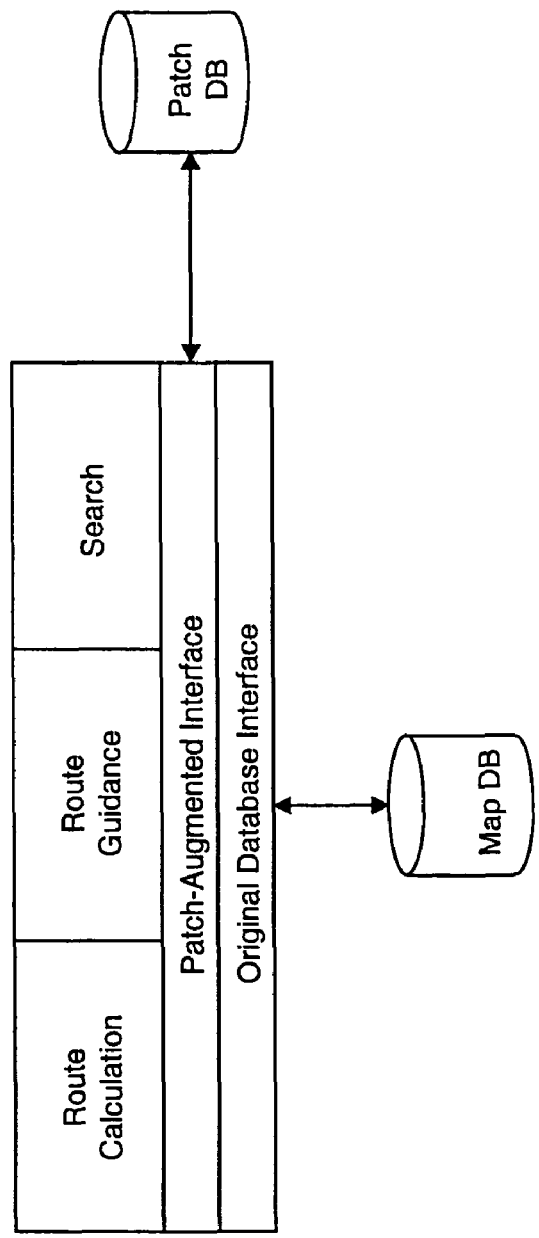
FIG. 1 depicts an augmented navigation database architecture in accordance with the present invention.

Response to a query on a graph, such as to retrieve data necessary for a route calculation, guidance or a point-of-interest search, can be controlled using a patch memory separate from an unmodified original graph, to be identical to a response based on an updated graph. Response to a query on an unmodified original graph may be modified to be consistent with an updated graph even though the graph was unchanged. This can be done using a separate patch memory. Accordingly, an application such as route calculation accesses a single database interface and does not have direct access to the patch memory nor to the original database. Instead the interface provides abstract access and hides the implementation details. An application could request the node nearest to a given location and not know whether the result was from the original database or was patched or even whether the database was patched at all. An exemplary architecture is shown in FIG. 1.

In one embodiment, each new link is added using the latest patched graph. Hence, if a $2^{nd}$ new link is added after a $1^{st}$ new link, and both are connected at a new node, the $2^{nd}$ new link will be added as if it is the first addition to an original graph (except that it is the original with all previous patches). One method of accomplishing this is to allow for nested patches, i.e. patches to patches. In essence, the patch management or maintenance software views the database using the same abstract view as applications. In a preferred embodiment, operations are either performed in sets where identification of all elements in the set precedes the changes described by the set or identification of elements uses a version of the original database before any of the changes in the set are applied.

There are three possible graph updates on a link-by-link basis: (1) deletion of a link; (2) addition of a new link; and (3) modification of an existing link. Deletion of a link may be accomplished by rejecting a response element including the given link. In other words, the patch mask highlights a link or node as "patched" and looks up the new entry that may simply tag or mark the entry as no longer existing (deleted).

Modification of an existing link may be reduced to the more general operation of deleting the old link and replacing the link with a new added link. There are a number of possible cases for link addition depending on the correlation of the vertices of a new link with existing vertices. Either the vertices already exist, correspond to points on existing edges, or are completely new.

Consider first the case where both vertices of a link already exist in the database. If both vertices connected to a new edge correlate to two existing vertices (referred to herein as class 1 vertices), then the two existing vertices can be replaced with the corresponding new vertices and a new connected edge can be added. Essentially, in this case, two old vertices are replaced with two new vertices that additionally connect to a new edge that is also added. All the new information is stored in the patch database. The fact that they are stored in the patch implies that the original database entries are to be ignored. In other words, two modified vertices in the patch memory replace the two vertices in the original database. The original database vertices are not deleted or modified but instead the patch interface ignores them because of the existence of replacements in the patch memory.

Patch database entries may be used to identify deletions or additions. A patch database may identify a deletion using a list of deleted vertices and/or edges that will not be forwarded to the application. A list of additions is correlated to the original database and forwarded to the application upon appropriate request. However, if a vertex does not correspond to a vertex in the original database (referred to as a Class 2 vertex), then an alternate method of vertex correlation is used.

An example of a Class 2 vertex is a new vertex that corresponds to a point on an existing edge. If the new vertex corresponds to a location on an existing edge (referred to as a Class 2*a* vertex), then that edge may be replaced by two new adjoining edges that connect to the new vertex. In effect, the appropriate operation in this case is to delete the old edge and add two new edges with a new vertex connecting them. The vertices in the original database are unchanged but are ignored by the patch interface because two replacement vertices now exist in the patch memory. The old edge is ignored because it is listed in the patch as deleted. The patched vertices no longer connect directly together but instead connect through a third new node that previously corresponded to a point on the old edge.

The third case for a single vertex is one in which the new vertex does not correspond to a point on an existing edge (referred to herein as a class 2*b* vertex). If a new link is comprised of two class 2*b* vertices, the resulting updated graph will not be fully connected. In this case, the update is merely a supplement to the database. If a new link is comprised of only one class 2*b* vertex the updated graph will be connected. Thus, there will be a new vertex and edge.

In one embodiment of the present invention, a link with two new vertices is not added to the patch database until at least one of the vertices corresponds to an existing vertex or a point on an existing edge (i.e. by way of another change). A link that is totally disconnected from the existing graph is not added. It is either avoided by ordering links in an update appropriately or cached until it can be connected (i.e. at least one of the vertices is of class 1 or class 2*a*). Once it can be connected, the class 1 or class 2*a* vertex connects the edge and other vertex to the graph. An unconnected link is not directly associated with the original database. However, it may still be considered by applications since the patch interface can include cached disconnected links in searches of the augmented database. This countermeasure overcomes the disconnection between the cache and augmented database. Lone edges, i.e. edges that are not connected to the main graph, are typically only useful for trivially short route calculations and thus there is little, if any, negative consequence of enforcing this patch order rule. This rule will be referred to as the First Patch Order Rule.

Since a vertex may be one of three different classes (1, 2*a*, or 2*b*) and a link has two vertices, there are six combinations of classes for a link: (i) both are class 1, (ii) both are class 2*a*, (iii) both are class 2*b*, (iv) one is class 1 and the other is class 2*a*, (v) one is class 1 and the other is class 2*b*, (vi) one is class 2*a* and one is class 2*b*. Having established a patch operation for each of the cases, the patch iteration operation as a whole may be considered. Since all cases have been enumerated and each case is addressed by a patch operation, a complete patch iteration procedure is specified that will allow the patch management or maintenance software to apply any received patch complying with ordering rules. However, note that the class of a vertex may not be known in advance. Thus the first steps in the patch iteration on a link are to identify the two vertices and determine the class of each of the two vertices. One approach is to consider each vertex separately and attempt to classify it. Another approach is to attempt to identify both vertices at the same time. Individual vertex identification is a preferred embodiment since, once identified each may be used to narrow the possibilities of the other or validate the identification. Each vertex can be classified by first searching for candidate vertices within a given range of a specified location of the vertex and then by attempting to match the vertex to each candidate in turn.

There are a variety of alternatives to correlate a given vertex with another vertex residing in the map database. Possible alternatives include precise location matching, identification matching and geographical pattern matching. The present invention proposes an improved logical pattern matching technique that overcomes limitations of the above approaches.

A logical pattern match operation consists of matching the logical relationships between links in a local area. A logical pattern is supplied in an update for a single link or vertex and might consist of a set of relationships to other links (or vertices and edges) within a predefined distance (or "hops" over vertices). Bandwidth requirements are reduced because only limited information needs to be transmitted and pattern matching is more efficient because matches are based on the logical graph relationships that can be compared with simple logical and rudimentary comparative mathematical operations (for example "is the degree of vertex c equal to the degree of vertex x?"). Furthermore, logical graph relationships can be far more invariant than identifiers, locations, road shape information and other geographical data. For example a logical pattern does not necessarily change even though a significant geometrical or physical change in roads or intersections occurs. Logical patterns representing road networks can be invariant with changes in intersection or road positions, attributes, and other parameters. For example, if two databases or two versions of a database differ only in the physical location of roads and intersections, a single logical pattern can correctly represent both.

In one embodiment, attributes of the pattern area may be included with the logical pattern for matching. Road attributes such as road classification, road names, light information, lane information, road width, and various other road attributes can be used to augment the pattern. Patches to border or new regions or changes to low symmetry road network areas such as highway exists or entrances or rural roads, then such augmentation with attributes is unnecessary.

Figure 2:
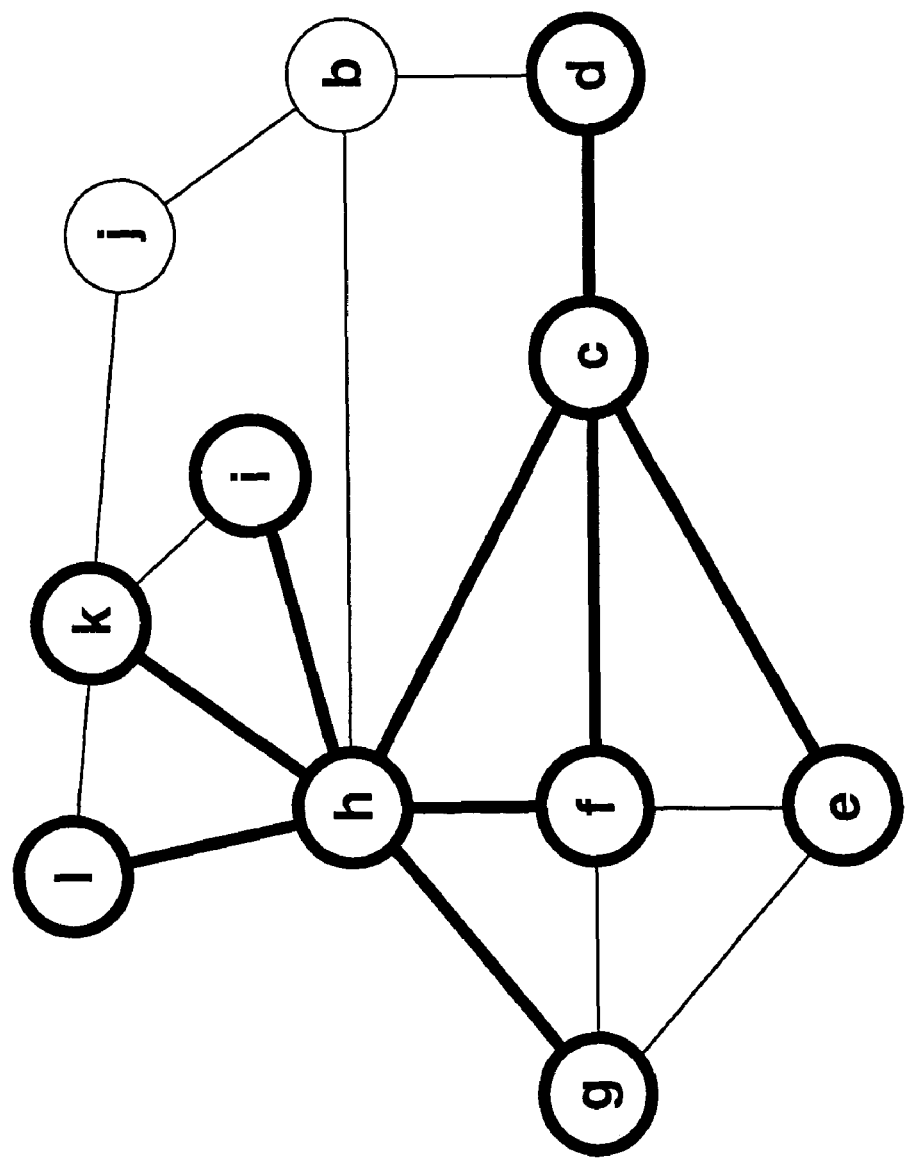
FIG. 2 illustrates an exemplary logical representation of the road topology in accordance with the present invention.

Logical pattern matching makes use of a logical pattern structure for comparison of logical patterns of vertices or edges to identify matches. Edge adjacency graphs are an example of such logical patterns. FIG. 2 depicts an example of local (i.e. 1 hop) logical relationships for a new link with the new edge 'ch' (i.e. the edge connecting vertices h and c). The bolded vertices are within one "hop" of the vertices adjacent to the new edge. However, it is envisioned that other types of logical pattern structures are also within the scope of the present invention. The following are examples of relationships that demonstrate some variants for these types of pattern structures: the degree of a vertex (i.e., the number of unique edges connected to the vertex); the directionally unique degree of a vertex (i.e., the number of unique directed edges connected that are directed in a given orientation); a tree pattern of adjacent edges to a given depth (distance or hops between intersections); and the combination of an adjacent edge tree pattern and leaf vertex.

Figure 3A:
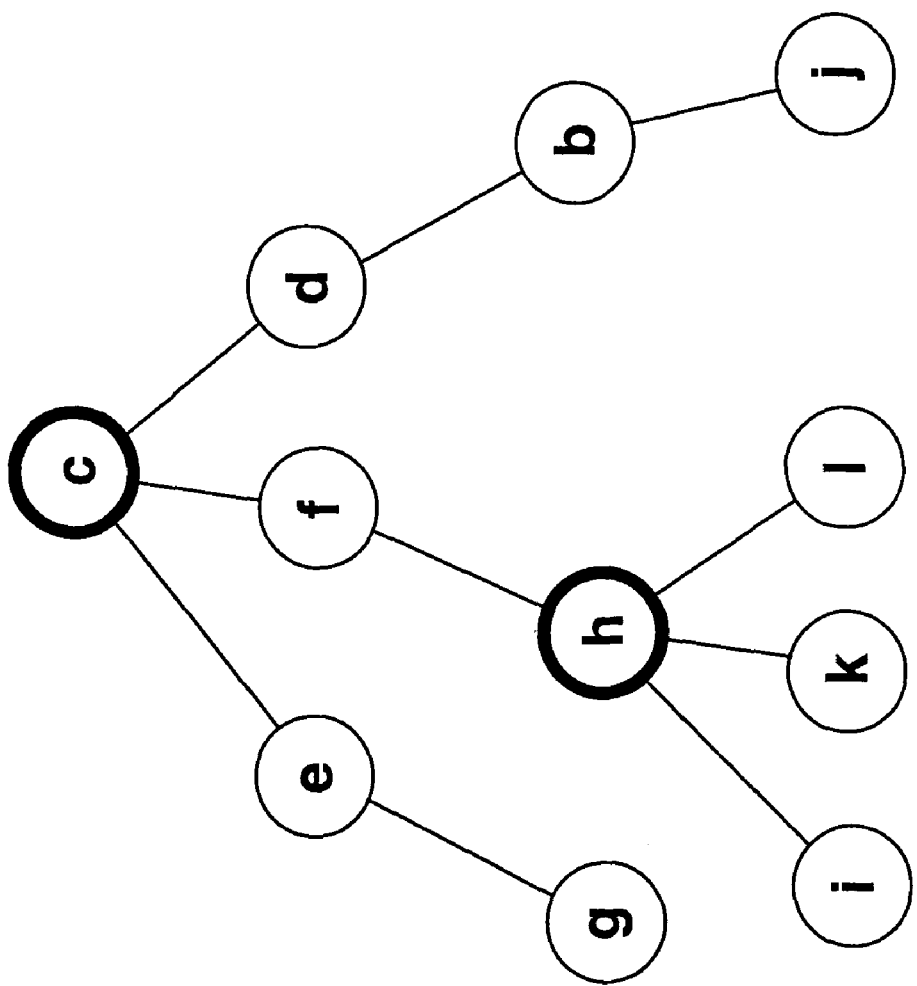
FIG. 3A illustrates an exemplary minimum spanning tree (MST) structure for vertex c in accordance with the present invention where vertex c resides in the navigation system map database.
Figure 3B:
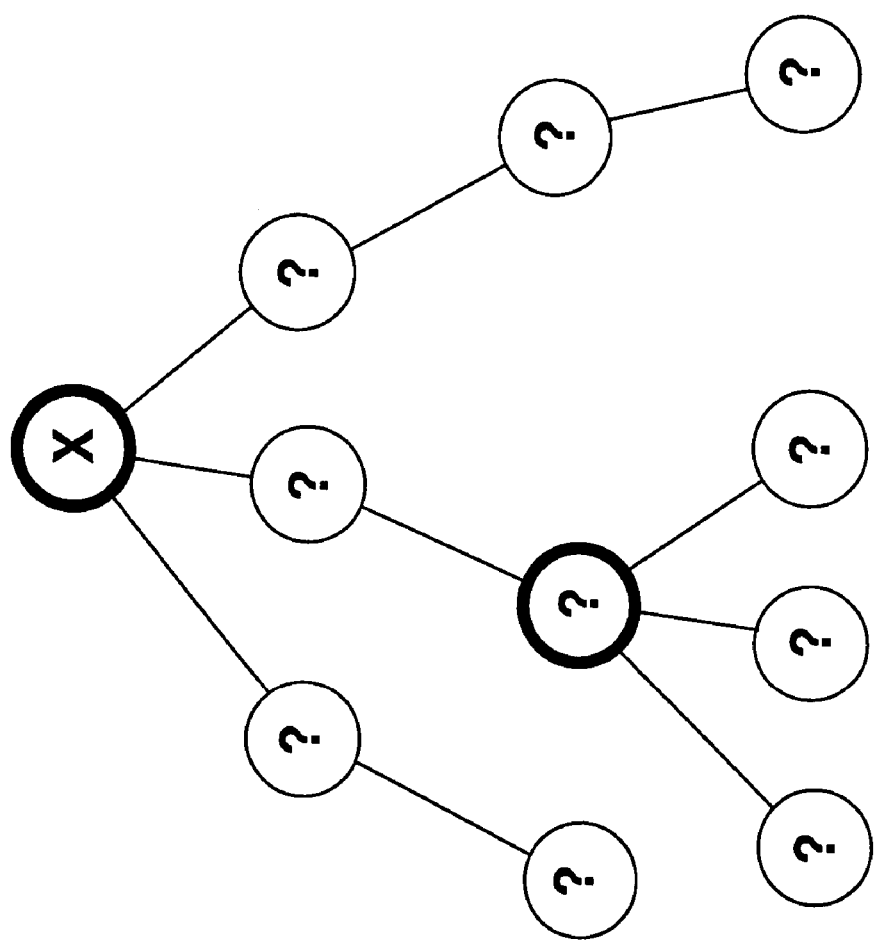
FIG. 3B illustrates a logical representation constructed for an update instruction in accordance with the present invention.

In a preferred embodiment, a tree structure is used to perform the logical pattern matching operation. FIG. 3A illustrates an example of a minimum spanning tree (MST) structure for vertex c. This tree graph may be generated by patch management software on a local device from the underlying map database and the patch data. To add the link 'ch', the minimum spanning tree shown in FIG. 3B is constructed and transmitted as logical identification of link x as part of a set of renewal instructions. A comparison of the graph (logical pattern) with a graph constructed from the navigation system's database for the same vertex will show that they are logically the same while being different from graphs of other nearby vertices. Vertex x is thus clearly and uniquely identified as vertex c. Although a minimum spanning tree minimizes the total weight from the leaves to the source, any unique graph tree may be used whether redundant or not, minimal or non-minimal. In a preferred embodiment, the order of the leaves is not important. In another embodiment, the order of the leaves reflects a clock-wise ordering of roads (edges) when viewed from above, for example.

A similar method is used for vertex h. Once the two vertices have been uniquely determined, the patch database (or, if modifiable, the original database) can be updated to incorporate the additional edge 'ch'. Note that the tree depth may be varied and may be differ between vertices or patch iterations. A smaller depth tree may be used for the comparison when simpler relationships suffice for uniqueness and the depth of the tree may be selected on an as-needed basis for uniqueness.

In an alternative embodiment, the minimum spanning tree for vertex c may be represented in table or nested list form and includes degrees of vertices for logical pattern matching as follows:

Logical pattern for vertex c
E (degree 3)
  G (degree 3)
F (degree 4)
  H (degree 6)
  I (degree 3)
  K (degree 4)
  L (degree 1)
D (degree 2)
B (degree 3)
J (degree 3)

Note that the identification of the nodes, i.e., identifiers E, F, G, etc above are not included in the pattern in a preferred embodiment (they are included above for the purpose of illustration). Such trees can be compared in a quick and easy logical operation progressing from 1 hop to n-hops from the vertex until the desired confidence is reached.

In one embodiment a tree pattern can contain wildcards that match any vertex degree or a degree within a range. For example a wildcard may match any of a 2-way, 3-way or 4-way intersection. Alternatively, a best-match comparison algorithm can be used to match a tree pattern to the closest matching pattern in the database. The closest matching pattern may be defined to have the least number of different vertex degrees or the least difference between vertex degrees for example. Numerous alternative definitions of "closest" are possible. Such best-match or closest-match methods allow flexibility to match road structures that may be different between database versions.

Figure 4:
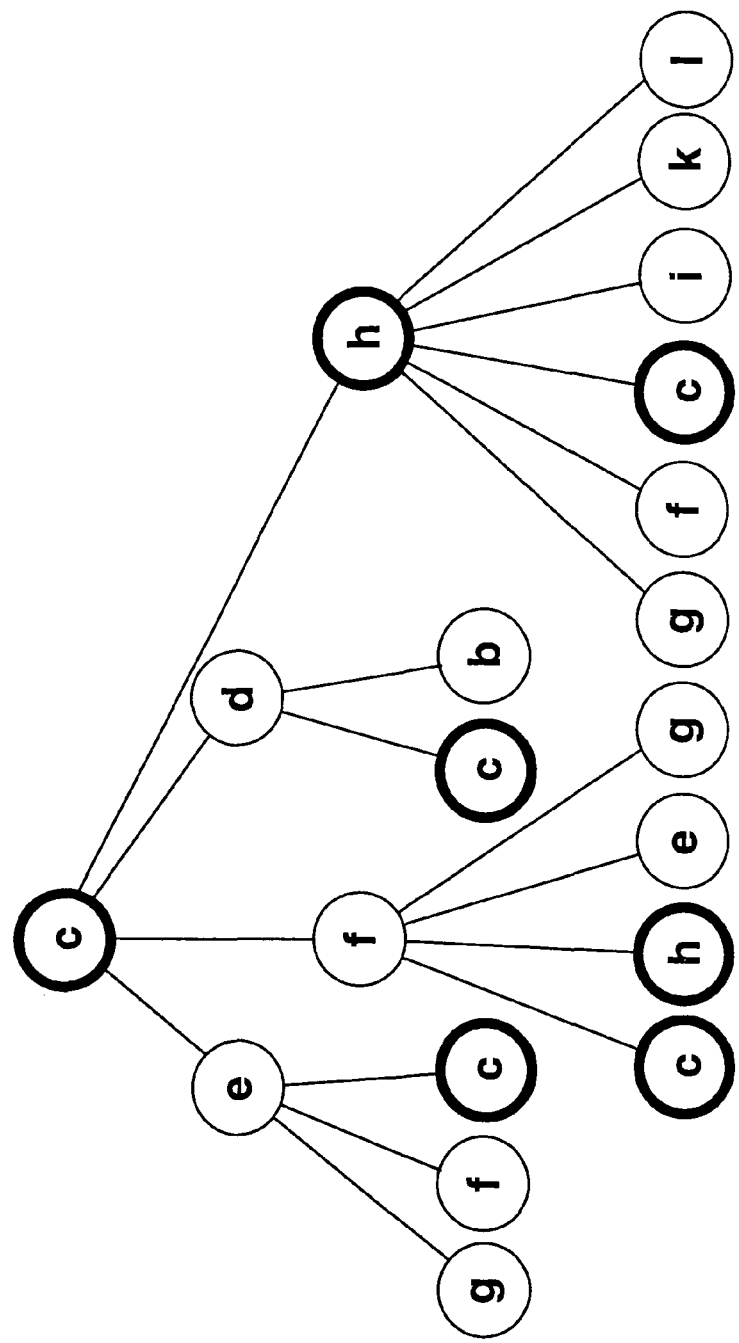
FIG. 4 illustrates an exemplary all spanning tree structure for vertex c in accordance with the present invention.

Although unique minimum spanning trees are achievable, generation of such trees is not necessary. An all-spanning tree (AST) structure is an example of another viable alternative. The all-spanning tree structure is a tree with redundant vertices such that either all leaves or no leaves are included for any given edge. FIG. 4 illustrates an exemplary all spanning tree structure. It is understood that all spanning trees may grow in size much faster than minimum spanning trees but are very easily generated. In addition, the storage required for each vertex remains the same as for minimum spanning tree so that the overall storage remains very small. Each tree node can be represented by a mere list of number of leaf nodes (degree). An example of a compact representation of a depth 3 all spanning tree structure for c (shown in FIG. 4) is the sequence of integers: 4 (3 (3, 4, 3), 4 (4, 6, 3, 3), 2 (4, 3), 6(3, 4, 4, 3, 4, 2)) or simply: 4, 3, 3, 4, 3, 4, 4, 6, 3, 3, 2, 4, 3, 6, 3, 4, 4, 3, 4, 2. Note that this compact form defines a tree using only leaf degrees. The first number is the degree of the root node c. The second number (3) is the degree of c's first leaf e followed by the degrees of each of e's 3 leaves (3, 4, 3). The next group is the degree of c's second leaf f followed by the degrees of each of f's 4 leaves and so on. In the preferred embodiment, the order of the leaves is not important.

For practical implementations, it is reasonable to narrow down the list of potential matches in advance by using a radius of error about the rough location of a node. For example, if the request for addition of a link 'xy' (i.e. 'ch') is accompanied by the logical representation for x and y as well as the rough locations of x and y, then candidate matches for x and y may be narrowed down to existing vertices in the rough area surrounding those provided locations. The range may be either predetermined or the implementation may select the nearest N vertices to the rough location provided in the patch request. Once a number of candidate existing vertices are identified, then the logical patterns (e.g., trees) are generated and logically compared to the logical patterns provided in the patch request.

As described above, tree structures are effective for logical pattern matching. A tree's inherent structure describes a road network pattern about the root vertex. The tree structure inherently includes the degree of each vertex in the tree and may thereby uniquely identify a vertex that matches the root vertex of the tree (and secondarily, identifying other nodes in the tree). Highly symmetric road networks may present a challenge for pattern matching and deeper trees may be required to uniquely match vertices. False vertex matches may result when the tree does not uniquely identify a vertex (i.e. two or more vertices match the pattern). A tree is generally specified to match the desired vertex but may coincidentally match one or more additional vertices if false-matches are not considered. If generation of trees does not consider false matching then a countermeasure such as statistical analysis can be used.

One approach to measuring chances of false matching is to collect statistics on tree patterns from a map database. There are only as many trees as there are vertices to count although the depth of the trees determines how many pattern combinations there are. Collecting statistics for very deep or for many depth variations may be time consuming and may be of limited value if the map is changed by even one vertex that substantially influences the graph network connectivity. Alternatively, expected pattern probabilities can be computed from vertex degree statistics.

Consider a probabilistic view of a road network where each vertex has an associated probability of having a certain outgoing degree (i.e. edges that can be followed leaving the current vertex, including U-turns or loops). The probability distribution of outgoing degree d, denoted P(d), may vary depending on the location. A downtown area might have a large proportion of one-way streets and have fewer outgoing edge choices for a driver at each intersection. The probability density function (pdf) for a downtown area might therefore be more heavily weighted toward lower d-values than a probability density function corresponding to a rural or urban area.

The probability of a node having the same outgoing degree as another node, denoted $p_0$, can be written as the sum of the probabilities that they each have the same degree:

$$p_0 = \sum_{d=0}^{\infty} P(d)^2 \qquad (1)$$

The value of $p_0$ is the probability that a tree of depth 0 will match a vertex and is dependent only on the probability distribution P. A tree of depth 1 has a probability $p_1$ of matching a vertex that can be determined by considering the probability of match depending on its degree. Let $p_1(d)$ be the probability a tree of depth 1 for a root vertex with degree d is matched. In order to correlate the leaves, consider without loss of generality that the leaves are ordered by their degree and thus, if there is a match, would all match the corresponding leaf. Hence, d leaves must have matching depth 0 trees;

$$p_1(d) = P(d) p_0^d \qquad (2)$$

Since the chance that a depth 1 tree has degree d, is P(d), the overall probability $p_1$ can be expressed as:

$$p_1 = \sum_{d=0}^{\infty} P(d)^2 [p_0^d] \quad (3)$$

and a tree of depth n has a probability $p_n$ of matching a vertex as follows, $$p_n = \sum_{d=0}^{\infty} P(d)^2 [p_{n-1}^d] \quad (4)$$

The probability of two abstract trees matching is the probability that the roots match in degree and that each leaf also matches. This recursive representation is convenient for computing the benefit of increasing the depth of the tree from n−1 to n.

Although different maps and different sections of maps may have widely varying degree statistics, vertex degree statistics P(d) can be collected for given map. Table 1 lists 5 exemplary scenarios for P(d) for d=1 to 4. In these scenarios, P(0) and P(d>4) are zero.

TABLE 1

Intersection Outgoing Degree Scenarios

| P(d) for depth d | 1-way | 2-way | 3-way | 4-way |
|---|---|---|---|---|
| Scenario 1 (Downtown) | ¼ | ½ | ¼ | 0 |
| Scenario 2 (Rural) | 0 | ⅓ | ⅓ | ⅓ |
| Scenario 3 | 0 | ½ | ½ | 0 |
| Scenario 4 | ½ | 0 | 0 | ½ |
| Scenario 5 | 0 | 1/100 | 99/100 | 0 |

Scenario 1 is meant to roughly represent a downtown street network configuration where one-way roads and turn restrictions are common. As a result the 2-way outgoing degree is strongly weighted. Scenario 2 represents a rural configuration where 3 and 4 way (U-turn permitted) intersections are common. Scenarios 3 through 5 are simplified in that only two pdf values are non-zero and are convenient for presenting an overall false match probability analysis over a range of pdf weights. Since scenarios 3 and 4 have the same set of probabilities, even though they are associated with different degrees, the two scenarios have the same probability of false match. In general, only the probabilities in the pdf are important in computing the match chance.

Figure 5:
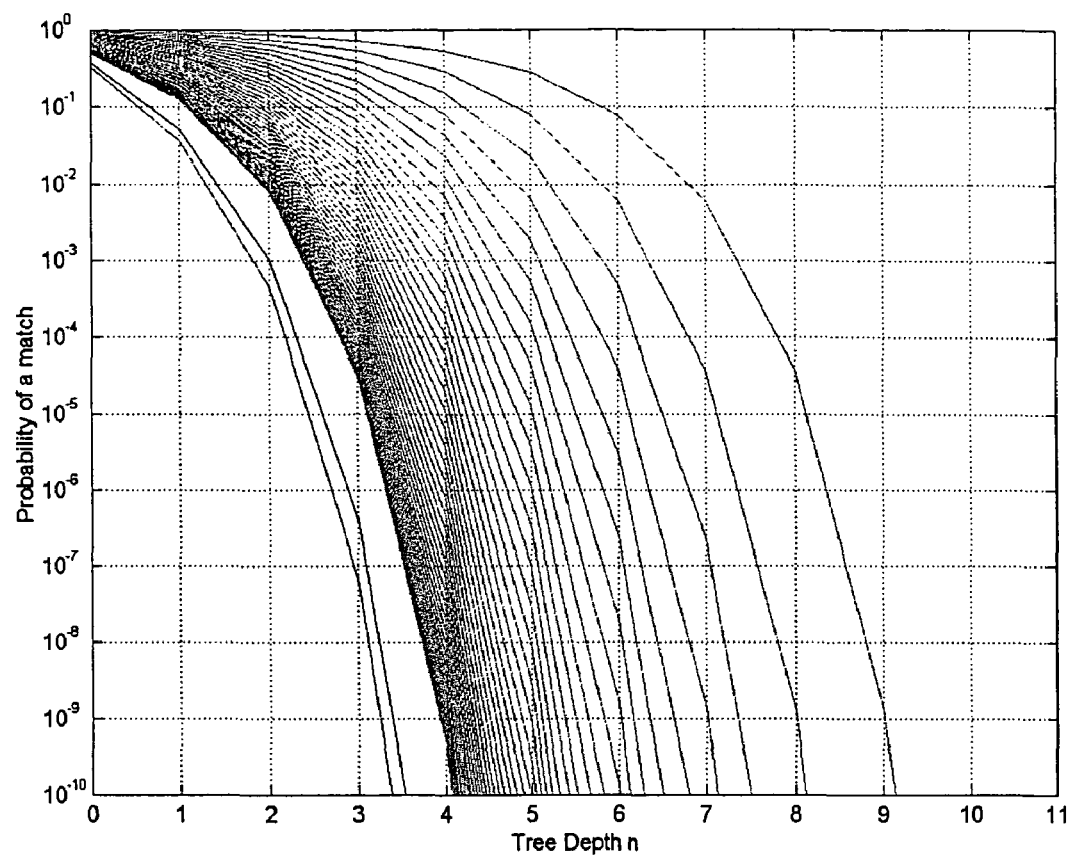
FIG. 5 depicts the probability of a false pattern match for different road network symmetry scenarios.

FIG. 5 is a plot of the probability of a chance match versus tree depth for a range of scenarios from scenario 3 to scenario 5 and also includes scenarios 1 and 2 for comparison. From this figure it is clear that a more balanced P(d) pdf results in a better (lower) false match probability. A false match probability of about 1 in a million vertices can be expected with a depth of 4 and a 50:50 pdf. Also note that spreading out the pdf further such as demonstrated by scenarios 1 and 2 results in even better (lower) false match probability.

FIG. 5 also shows how more unbalanced pdfs (highly weighted in one value) have a greater impact on chance match probability. This is clear from the wide separation in the curves on the right-side versus the tight, if visible, separation in the curves on the left since all adjacent curves have the same difference of 1% in pdf values (i.e. the right-most curve is [0.99 0.01] and the next right-most curve is [0.98 0.02]).

Even in a very high symmetry case where only 1% of vertices are different (in terms of degree) than the most common vertex type (as demonstrated by scenario 5) a very low match probability is expected if a relatively simple tree is used. For example, a tree depth of 9 results in approximately 1 in a million probability of a chance (unexpected) match. Furthermore, if the most common degree is d, then the maximum tree size is expected to be about:

$$N = \sum_{i=0}^{D} d^i \quad (5)$$

where D is the tree depth and N is the maximum number of possible nodes in a tree for a map where the maximum vertex degree is d. Alternatively, N is defined as an estimate of the number of possible nodes in a map where the most common vertex degree is by far d.

For example, using a tree depth of 4 results in maximum tree size of about 120 vertices that would require 30 bytes to represent uniquely (since a tree can be uniquely represented by a simple flat list representation of vertex degrees, this would require N vertex degree values each with 2 bits for a degree value of 0 to 3). From FIG. 4 it is clear that a tree depth of 4 gives a very low chance match expectation for all but the most symmetric scenarios. Even for a [0.90 0.10] scenario, the chance match probability is on the order of 1 in 1000. However, an expectation of about one in 10 million or even much less would be typical in all but the most symmetric of cases.

In all but the most symmetric of cases, as indicated above, a tree depth of 3 to 5 will typically suffice to achieve less than 1 in a million or 10 million chance matches. It is also clear from this analysis that trees with a depth of more than a certain amount provide decreasing gain. This motivates augmenting tree patterns with vertex or edge attributes.

A wide variety of attributes are used for different applications such as route calculation, guidance, map matching, and geo-coding or reverse geo-coding. These attributes may have varying degrees of uniqueness or utility for pattern matching purposes. Table 2 is a representative list of vertex and edge attributes from the KIWI navigable map database format.

TABLE 2

Relative Value of Attributes for Pattern Matching

| Attribute | Value | Reason |
|---|---|---|
| Intersection Name | High | Uniqueness |
| Link Class Code | High | Variation |
| Link Length | High | Variation |
| Road Class Code | High | Variation |
| Road Name | High | Uniqueness |
| Street Address Data | High | Uniqueness |
| Building and Facility Data | Medium | If coverage is good |
| Intersection-type | Medium | Variation |
| Number of Lanes | Medium | Variation |
| Passage Code Regulations (based on time/date) | Medium | Variation |

TABLE 2-continued

Relative Value of Attributes for Pattern Matching

| Attribute | Value | Reason |
|---|---|---|
| Regulation Factors | Medium | Variation |
| Average Traveling Time | Low | Variation over time |
| Caution Point Information | Low | Low applicability |
| Crossable Oncoming Lane, Medium strip (open/close), Center Line Existence | Low | Low variation |
| Direction of Road | Low | Inherent |
| Direction Guide Data List | Low | Low applicability |
| On-boundary node flag | Low | Low applicability |
| Passage Code Regulations (based on vehicle type) | Low | Low applicability |
| Road Status | Low | Variation over time |
| Road Structure | Low | Low applicability |
| Road Structure Data List | Low | Low applicability |
| Road Width (Lane Width) | Low | Low variation |
| Speed Limits | Low | Non-uniqueness |
| Spot Guide Data List | Low | Low applicability |
| Statistical Costs | Low | Variation over time |
| Up/Down Separated Lanes | Low | Low applicability |

Attributes that have a large range of values and highly varying or have high rates of uniqueness are highly valued while redundant (inherent), low applicability, sparse or very non-unique attributes are less highly valued. Attributes that require significant memory to represent are also valued less than compact values. There is a tradeoff between uniqueness and memory size requirements although this tradeoff is only relevant at small memory sizes since n-bit values have $2^n$ combinations.

In addition to communicating a tree for nodes in an update, attribute information can assist in the pattern matching operation. Clearly some attribute information is necessarily part of updates such as attributes of new vertices and edges. However, attributes of existing vertices that are to be matched to attributes of existing vertices in the current database may also be communicated. These vertices or edges that are not being patch are hereafter referred to as extraneous vertices or extraneous edges.

In general, attribute information size should be considered in addition to the value of the attribute type. For example, a road or intersection name might be highly valuable but require more memory or transmission bandwidth than the number of lanes. Additionally, some attributes such as text strings or names have considerable memory requirements. These sizes may or may not be relevant depending on the memory impact of alternatives such as increasing tree depth. Increasing tree depth may be preferable if it lowers the chance of false match with less memory than additional attributes.

Including attributes of extraneous vertices or edges, i.e. other than the ones being patched also presents the question of how many vertices attributes should be included. Both memory and patch format flexibility can be considered. A patch format that is flexible enough to support varying types of attributes and varying amounts of attributes, such as attributes for vertices of varying depth in trees, might require significant overhead simply to represent the description of what information is included in the patch. This would also imply additional complexity on the patch application and patch generation software. In one embodiment, extraneous attributes of all but the smallest field sizes are avoided in favor of deeper trees.

Optimal contents of a patch, i.e. patterns and attributes, can be determined either statistically or deterministically. Statistical approaches include determining statistics for maps or map areas or dynamic statistics depending on the area being patched (requiring a variable patch format). Both approaches would conceivably be used to configure patch formats and/or contents. A deterministic approach would determine the appropriate patch content for a particular patch operation.

Statistical approaches require establishment of a desired or target probability of false match. Probabilistic methods are then applied to patch generation or patch format specification using the target value and collected statistics. A basic probabilistic approach might use a statistically determined pdf P(d) as a basis for determining tree depth n such that $p_n$ is less than or equal to the desired probability of false match. This method implies a certain expected probability of false match $p_f$. FIG. 6 is a flow chart showing how to determine the tree depth required to achieve the desired $p_f$. The basic probabilistic approach may be extended to incorporate attributes by collecting statistics on attribute uniqueness as well. For example, statistics collection might include determining the probability of a road having L lanes, or having the name "Main Street". Even a unique road name without a tree pattern may have a considerable non-zero chance of a mismatch since there may be multiple vertices on the same road segment or even multiple vertices representing an intersection. Once statistics are collected, they may be used along with the P(d) pdf to compute the required tree depth and attribute content in a similar manner as shown in FIG. 6.

An alternative approach is to use an adaptive method for the selection of update parameters. Update parameter determinations such as selecting tree depth and whether or not to include certain attributes occurs at the time of generating the update and might depend, for example, on the uniqueness of the particular vertices or edges being updated.

In one embodiment, temporal applicability of patches is defined so that even though the contents of individual patch instructions may be sufficient for application at any particular point in time, a specific time is defined to ensure self-consistency and guarantee pattern matches occur as intended. A patch may change the pattern that, in a manner of speaking, it attempts to match.

Figure 7C:
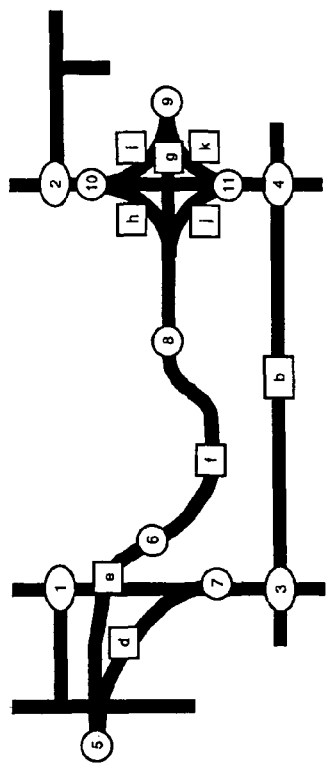
FIGS. 7A–7C illustrate an original local graph pattern, a patch graph pattern, and a patched local graph pattern, respectively.
Figure 7B:
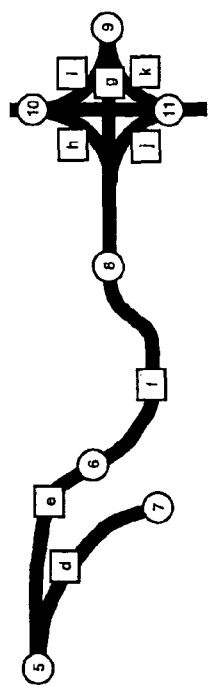
Figure 7A:
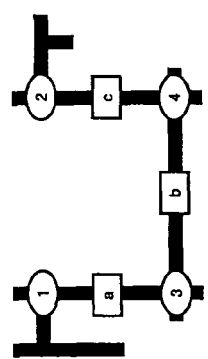

FIG. 7 depicts (a) an existing navigable map database, (b) a new highway and ramps to be patched, and (c) the patched navigable map database. According to the patch order rule set, links are added in an order starting with links connected to the existing database vertices. Thus a ramp is added before a highway section. For example, edge 'd' is added, followed by edge 'e' and then edge 'f' and so on. Furthermore, according to the rules, since vertex 7 does not exist, edge 'a' is first replaced with two new edges connecting vertex 1 to 3 via an intermediary new vertex 7.

Figure 8:
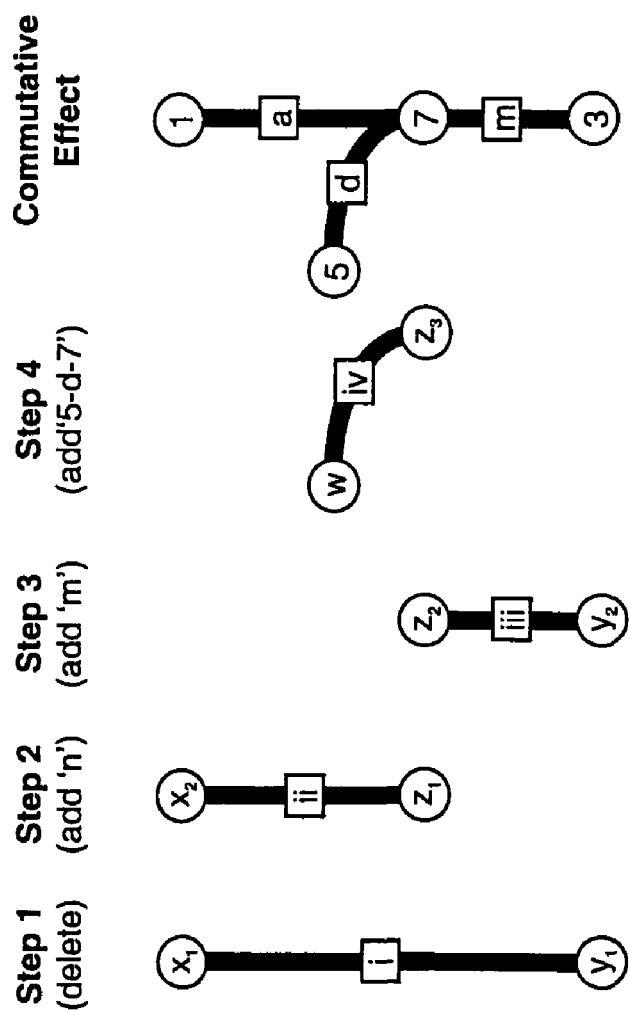
FIG. 8 depicts a multi-step portion of a patch update in accordance with the patch order rules of the present invention.

FIG. 8 depicts a multi-step portion of the patch update to accomplish the cumulative effect of adding the highway entrance ramp edge 'd' of FIG. 6 at a midpoint along an existing edge 'a'. This 4-step process includes deleting the original edge, adding two edges that combine to replace the deleted edge and add the new edge representing the ramp. Note that the ramp was not added directly since, according to the $2^{nd}$ Patch Order Rule, class 2a vertices such as z are added as class 2b vertices through the edge replacement steps to avoid confusion and pattern matching complications relating to class 2a matching.

Pattern graphs (trees) for $x_1$ and $x_2$, are different because, having recognized $x_1$ as vertex 1, edge a (i) will be deleted and vertex 1 will no longer be connected to vertex 3. In other words, Step 1 will change the existing database so that node 1 (vertex 1) will have a different degree and tree. If a new pattern match was required to match $x_2$ to vertex 1 a valid tree would be required for $x_2$ that matched the latest tree for vertex 1 (i.e. $x_2$'s tree would not include an edge to vertex 3. Fortunately this is not necessary with the present invention.

The reason that a second different tree for $x_2$ is not required is that the patch application already matched $x_1$ to vertex 1. Therefore, the update step 2 need only specify that $x_2$ is merely $x_1$. Identifiers or pointers/offsets can be used to accomplish such specification. The patch application, in turn, looks up which node it matched to $x_1$ and declares $x_2$ a match to the same node. Therefore, in a preferred embodiment, there is no need to send more than one tree for any given vertex even if the vertex's tree changes one or more times.

Thus the update of FIG. 8 might have the contents shown in the table below. Note also that declarations of vertex equivalents for steps that are not immediately related are also valid. For example, an addition of a new road leaving vertex 3 could be part of the same update and would not include a tree for vertex matching to vertex 3 but rather include a declaration of the source node being the same as $y_1$.

TABLE

Example of Multi-Step Portion Contents

| Update Step | Instruction | Parameters |
|---|---|---|
| i | Delete | $x_1$'s tree, $y_1$'s tree |
| j | Add | declare $x_2 = x_1$, $z_1$'s tree |
| k | Add | declare $z_2 = z_1$, and $y_2 = y_1$ |
| l | Add | declare $z_3 = z_2 = z_1$, w's tree |

The update steps in the above table are labeled as i through l to indicate that these may be part of a larger list of patch instructions and need not necessarily be encapsulated together. In fact, they need not even be grouped together or sequential although the specified order is important if the declarations reflect an order. A patch's instruction portion may be represented by an ordered list of such instructions and their associated parameters or pointers to their associated parameters. For example, the trees may be stored in a separate section of the patch.

Formulating updates using such declarations is not primarily motivated by compression or bandwidth requirements (although it does result in highly compact updates) but rather to avoid temporal and causality complications. An update step may modify the attributes or structure of the graph such that the same pattern no longer matches. In addition, subsequent attempts to match nearby vertices may also fail because of structural changes.

The temporal ordering of graph update steps in a patch application process results in specific and potentially different dynamics in overall graph structure and local graph patterns during that process. Recognition of this problem is the basis for the Declaration Rule of map database update contents, i.e. patch generation, and for the Identification Priority Rule for patch application. Temporal ordering implies that a graph pattern such as an MST may only be valid at a specific time.

A Declaration Rule is defined as so that any graph update step requiring match of a vertex X, where a vertex Y corresponding to the same node (vertex) was previously required to be matched for a previous step, declares equivalence of that vertex X to the corresponding vertex Y in the previous update (instead of including a graph pattern for that vertex X). However, even if a vertex was not modified in a previous step, a vertex in the vicinity may have been modified substantially to alter the local graph pattern. Here, 'local' refers to the graph pattern about the unmodified vertex and 'vicinity' refers to the extent of a local graph pattern such as is defined by the depth of an MST. A local graph pattern is substantially modified if a matching pattern for the vertex that might be contained in a patch update does not match both the unmodified and modified local graph patterns. In essence, a pattern has a particular time of applicability (or validity). In one embodiment, the time of applicability is defined to be before the patch is applied and this forms the basis for the Identification Priority Rule.

The Identification Priority Rule specifies that the time of pattern matching a vertex is: (i) for class 1 vertices, before applying any steps of the patch; and (ii) for class 2 vertices, no pattern match should be required but rather all subsequent references to the same vertex are declared to be equivalent according to the Declaration rule. As a result of the Identification Priority Rule, graph pattern information for each vertex need only be communicated once for each patch and all class 1 vertices (the only vertices that need to be matched) can be matched before making any changes in what can be called an identification or pattern match stage of the patch application.

Patch management could conceivably become very complex if a database is patched more than once. In one embodiment, compatibility between patches may be maintained by always using only the original database for pattern matching and by maintaining identifications of new vertices. In another embodiment, subsequent patches are applied by pattern matching with the augmented database before applying the next patch.

Figure 9:
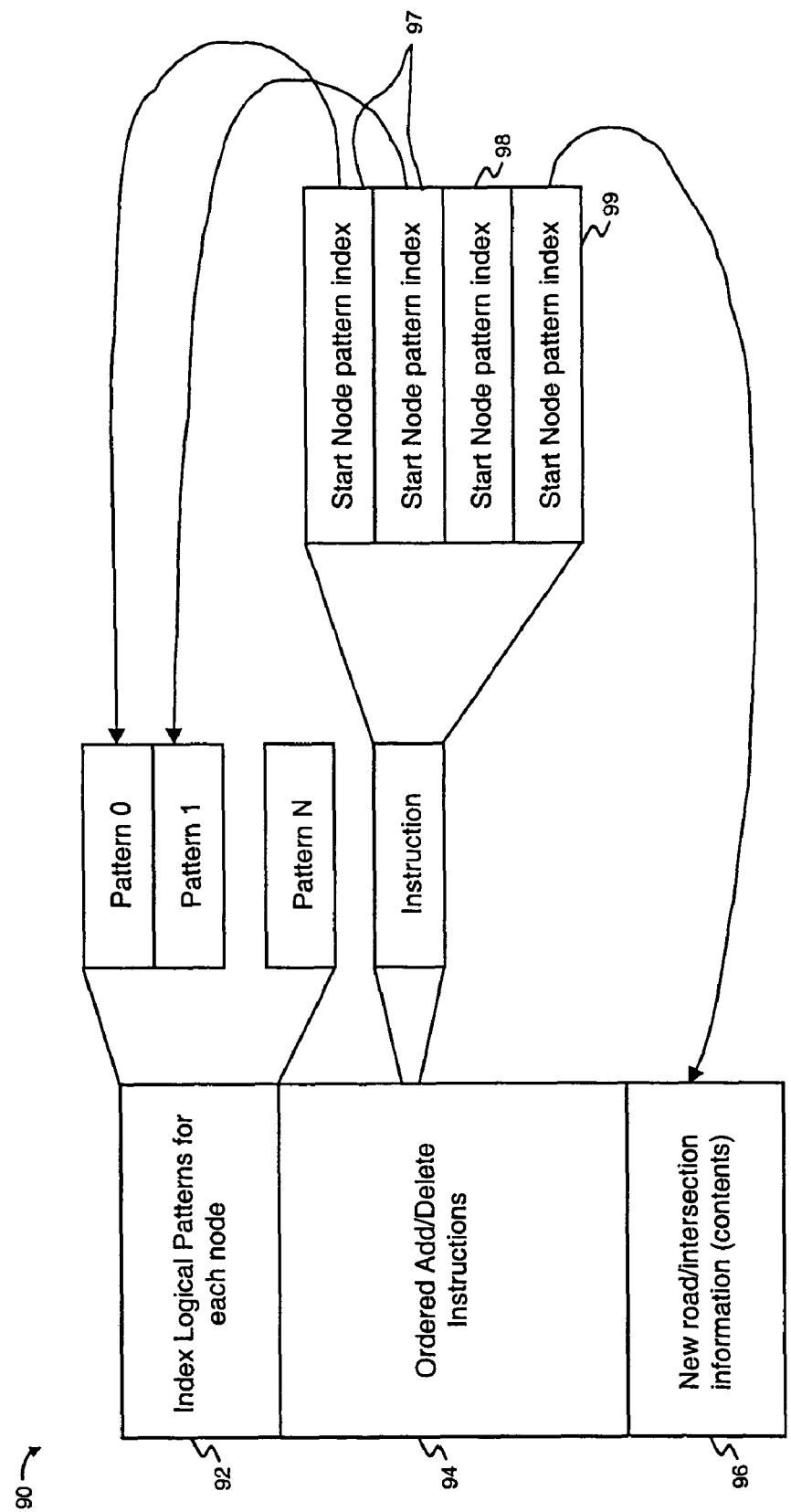
FIG. 9 illustrates an exemplary content of a navigation map database renewal.

FIG. 9 illustrates an exemplary content of a navigation map database renewal. The renewal 90 is comprised of three sets of information: (i) logical patterns 92 that are used for matching, (ii) instructions 94 to add or delete links including actual or implied declarations of equivalence, and (iii) new or replacement (renewal) data 96 to be stored in the modified or patched database. Each instruction may contain an index or identifier 97 of the pattern to use to match for both the start and end nodes, an instruction type (add or delete) 98 and a pointer or index 99 to new or replacement data if applicable. The changes to the navigation database are described in steps. Each step (instruction) describes a unitary add or delete operation to a link (road section) between two intersections (nodes). The changes are associated with the logical patterns required to identify the affected roads and/or intersections. The logical patterns include, for example, tree patterns and may or may not be complimented with one or more high-utility attribute patterns to assist in identification. It is readily understood that other procedures and formats may be employed which conform to the principles and patch rules set forth above.

Figure 10:
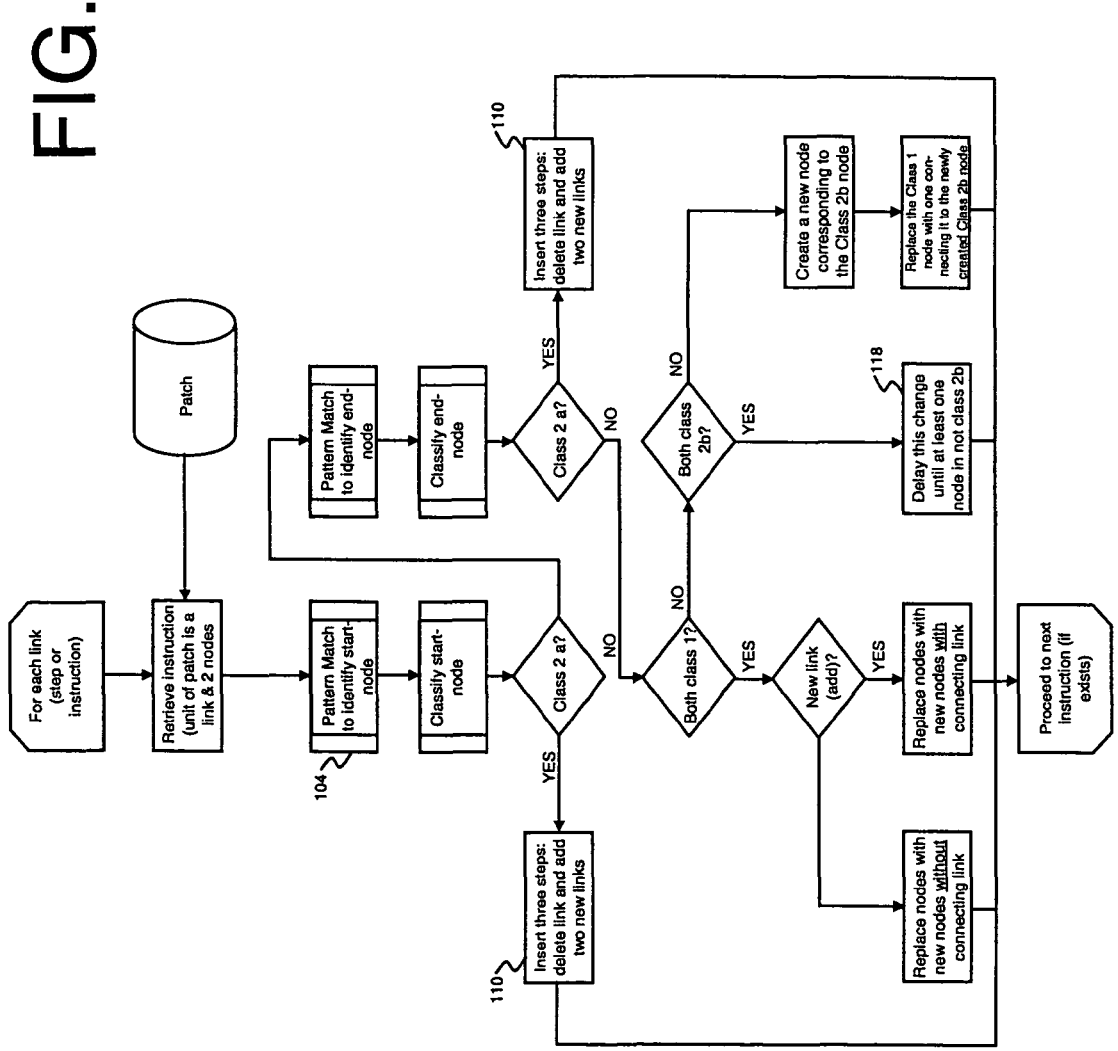
FIG. 10 depicts a flow chart showing an exemplary procedure for applying an update to a navigation database in accordance with the present invention.

FIG. 10 depicts an exemplary procedure for applying an update to a navigation database in accordance with the above-described principles and patch rules. FIG. 10 depicts a loop that cycles through each instruction in the patch. In one embodiment, all the patterns have been previously matched according to the temporal rules and principals described above. In another embodiment, the pattern matching is executed, if necessary, for each of the start and end nodes of an instruction as depicted at step 104. However, in the preferred embodiment, the pattern match compares the received logical pattern to the database at a particular point in time, such as before any of the instructions from that patch have been applied. After the start and end node are identified and classified, the patch operation is determined (not necessarily executed since execution may be delayed until completion of all pattern matching). Class 2*a* nodes are handled by inserting operations to change them into class 1 nodes as shown at step 110. Note that upon addition, i.e. actual execution of a patch operation, any class 2 (*a* or *b*) node becomes a class 1 node. According to the patch order rules, addition of lone links (i.e. those that have start and end nodes that are both class 2*b*) are delayed until at least one is no longer a class 2*b* node as shown at step 118. It is readily understood that other procedures may be employed which conform to the principles and patch rules set forth above.

Figure 11:
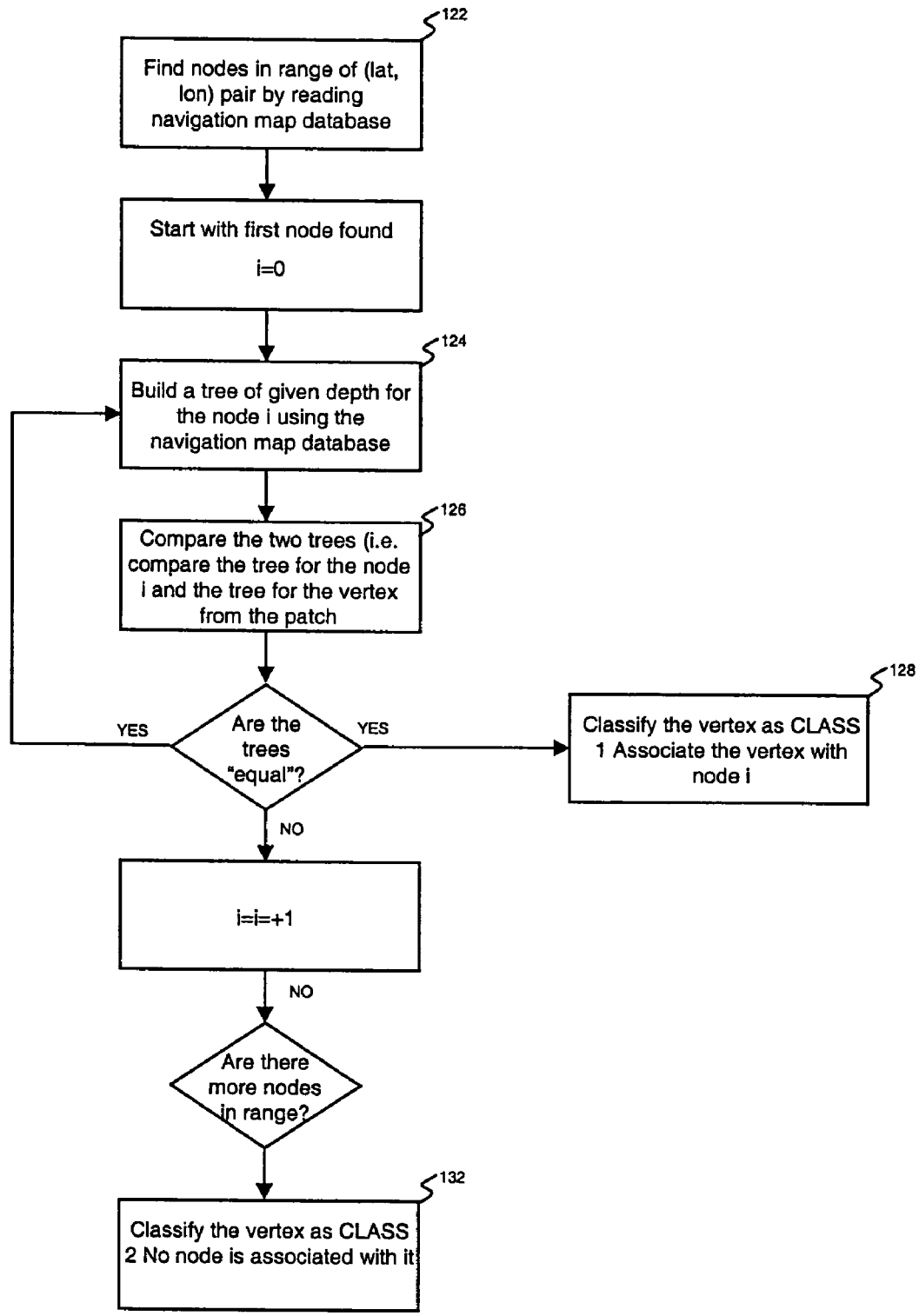
FIG. 11 depicts an exemplary procedure for pattern matching and classification.

FIG. 11 depicts an exemplary procedure for pattern matching and classification. The pattern matching operation first collects from the existing database vertices that are in the general vicinity of the vertex to be renewed as shown at step 122. For example, this may comprise searching for vertices within a physical range of an approximate location given for the vertex to be renewed. The procedure may optionally sort those by proximity to the approximate location. Then, for each candidate vertex, a logical pattern is built at step 124 from the existing database and compared at step 126 to the pattern supplied in the renewal. If a match is found, the vertex is classified as a class 1 vertex. Otherwise, if none of the vertices in range matched, the node is determined to be a class 2 vertex at step 132. Possible embodiments of the match include the first "exact" matching tree or the best matching tree. Various alternatives are possible as disclosed above. Additionally, further classification of a class 2 vertex as either class 2*a* or 2*b* is accomplished by building patterns as if there were a vertex between the start and end point on each link within the viscinity. If a match occurs with such a "virtual" vertex, then the renewal vertex is classified as class 2*a*. It is readily understood that other procedures and formats may be employed which conform to the principles and patch rules set forth above.

The methods of pattern matching and classification of the present invention can also be used to detect database version issues and renewal version applicability. Apparently out-of-order instructions (as per the patch order rules) can indicate that the navigation system has missed a previous renewal. Instructions to delete already non-existent links or add already existing links can be indicators that the database version already includes the renewal. Furthermore, the methods of the present invention can be applied to multiple forms of navigation map database storage. Navigation map databases may comprise multiple representations of a road network tailored for particular applications, such as the parcel (guidance) and region (route calculation) sections of KIWI databases. In this case, alternate representations can be used to confirm pattern matches (identification) and classifications of a node (or link) or as a backup or fallback source for generation of patterns.

In an alternative embodiment, a random access memory may be used to store the navigation map database or section of the navigation map database and the renewal can be applied directly to the database instead of maintaining a separate patch memory.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for applying an update to a navigation database, comprising:
receiving an update instruction specifying two nodes and a link, where the nodes represent road intersections and the link represents a road segment interconnecting the two nodes;
identifying an existing node in the navigation database which corresponds to at least one of the specified nodes using a logical pattern matching operation by constructing a graph with a structure representative of the road topology in the vicinity of at least one of the specified nodes and comparing the graph to a logical representation of the navigational database;
classifying each of the specified nodes based on its relation to at least one of an existing node or an existing link in the navigation database; and
applying the update instruction in accordance with an ordered operations rule set.

2. The method of claim 1 where the step of comparing the graph to the logical representation further comprises performing a minimum spanning tree matching operation, where the graph is-defined as a tree graph and the at least one specified node serves as a root node for the tree graph.

3. The method of claim 1 where the step of comparing the graph to the logical representation further comprises performing an all spanning tree matching operation, where the graph is defined as a tree graph and the at least one specified node serves as a root node for the tree graph.

4. The method of claim 1 wherein the step of classifying each of the specified nodes further comprises categorizing a specified node as one of the group consisting of: a node corresponding to an existing node in the navigation database, a point on an existing link in the navigation database, a not-yet-existing element in the navigation database.

5. The method of claim 1 wherein the ordered operations rule set specifies that a link having two nodes which correlate to existing nodes in the navigation database can be added to the navigation database.

6. The method of claim 1 wherein the ordered operations rule set specifies that a link having a node which is a point on an existing link in the navigation database is added by deleting said existing link and adding two links interconnecting said node to other existing nodes in the navigation database.

7. The method of claim 1 wherein the ordered operations rule set specifies a link having two nodes where neither node correlates to an existing node in the navigation data is not be added to the navigation database.

8. The method of claim 1 wherein application of the update instruction is delayed in accordance with the ordered operations rule set until a subsequent update instruction is applied to the navigation database.

9. A method for generating a database renewal for a navigation database, comprising:
providing a list of links to be updated in the navigation database, where each link is represented as two road intersections interconnected by a road segment;
constructing a logical representation for each road intersection uniquely specified in the list of links, such that the logical representation is indicative of the road topology in the vicinity of specified road intersection by building a graph with a structure representing the road topology in the vicinity of the at least one road intersection, where nodes of the graph represent road intersections and links of the graph represent road segments; and formulating an ordered set of update instructions for the list of links to be updated in the navigation database, such that each update instruction references at least one logical representation.

10. The method of claim 9 further comprising compiling each of the logical representations and the ordered set of update instruction to form a database renewal.

11. The method of claim 9 further comprising identifying attribute data associated with either road segments or road intersections specified in the list of links, and formulating the ordered set of update instructions, such that at least one update instruction references the attribute data.

* * * * *